United States Patent [19]

Briggs et al.

[11] Patent Number: 4,702,078
[45] Date of Patent: Oct. 27, 1987

[54] MASTER CYLINDER

[75] Inventors: Stuart J. Briggs; David J. Parker, both of Staffordshire, England; Peter Schlüter, Koblenz, Fed. Rep. of Germany

[73] Assignee: Lucas Industries Public Limited, Co., Birmingham, England

[21] Appl. No.: 894,505

[22] Filed: Aug. 6, 1986

Related U.S. Application Data

[63] Continuation of Ser. No. 593,570, Mar. 26, 1984, abandoned.

[30] Foreign Application Priority Data

Mar. 31, 1983 [GB] United Kingdom ................. 8309054

[51] Int. Cl.$^4$ ............................................ B60T 11/26
[52] U.S. Cl. ............................................ 60/585; 220/8
[58] Field of Search ......................... 60/585, 533, 592; 220/8; 206/501

[56] References Cited

U.S. PATENT DOCUMENTS

| 3,479,068 | 11/1969 | Brittain | 60/585 |
| 4,294,072 | 12/1981 | Flynn | 60/585 |
| 4,418,534 | 12/1983 | Duffy | 60/585 |
| 4,514,983 | 5/1985 | Gaiser | 60/585 |

FOREIGN PATENT DOCUMENTS

| 1196173 | 11/1959 | France | 60/585 |
| 83648 | 6/1980 | Japan | 60/585 |
| 2082277 | 3/1982 | United Kingdom | 60/588 |

Primary Examiner—Abraham Hershkovitz
Attorney, Agent, or Firm—Holman & Stern

[57] ABSTRACT

A fabricated master cylinder includes a pressure cylinder and a separately made reservoir mounted thereon by way of a mounting device on the cylinder and a mounting formation on the reservoir. The mounting device and reservoir provide restraint surfaces for engagement by a locking device which, when engaged, maintains the cylinder and reservoir in co-operative relationship. In an alternative arrangement, the restraint surfaces are on respective parts of the mounting device and formation which, themselves act as locking means.

5 Claims, 7 Drawing Figures

MASTER CYLINDER

This is a continuation of application Ser. No. 593,570, filed Mar. 26, 1984, now abandoned.

BACKGROUND OF THE INVENTION

1. Field of the Inventon

This invention relates to a master cylinder for vehicle braking systems and more particularly to a master cylinder of the fabricated type which includes a pressure cylinder and a separately made reservoir mounted thereon, the interiors of the pressure cylinder and reservoir being in communication by way of transverse ports through the peripheral cylinder wall.

2. Description of the Prior Art

It has been proposed to retain the reservoir on the pressure cylinder by means, for example, of a variety of clamping or clipping devices co-operating with the two components, sometimes in conjunction with a further connection formed by an inter-engaging spigot and recess respectively on the two components. These arrangements can be unsatisfactory in that the assembly of the reservoir and cylinder can lack sufficient rigidity which can lead to problems of sealing between the two components. They can also lead to a significant increase in the height of the assembly as compared with some conventional types of master cylinder.

BRIEF SUMMARY OF THE INVENTION

An object of the invention is to provide a master cylinder of the fabricated type in which the aforesaid disadvantages are minimized or avoided.

According to the present invention, a master cylinder comprises a pressure cylinder, a reservoir mounted thereon, a mounting device on the cylinder providing at least one retaining surface, a formation on the reservoir such as to engage with the mounting device and having at least one retaining surrace which, when the device and formation are so engaged, is opposed to said mounting device retaining surface, and locking means operable to retain the reservoir and cylinder in operative working relationship by way of said opposed retaining surfaces.

Conveniently, said reservoir formation or said mounting device forms a recess complementary with and for the reception of the other of said formation and device, the recess containing a resilient sealing ring and the arrangement being such that engagement of said formation or device in the recess compresses the sealing ring between opposed surfaces to form a fluid-tight seal.

The locking means may be a separate component capable of engaging said opposed surfaces to effect the aforesaid retention of the reservoir and cylinder.

Alternatively, the locking means may be constituted by respective parts of said mounting device and reservoir formation, each of which is provided with one of said opposed surfaces which are brought into locking co-operation by relative movement between the reservoir and cylinder.

Typically, said relative movement includes a first linear movement to bring said surfaces into adjacent relationship, and a second rotary movement to bring them into locking engagement.

Preferably, said mounting device incorporates one or more ports permitting communication between the reservoir and pressure cylinder.

BRIEF DESCRITION OF THE DRAWINGS

The invention will now be described, by way of example, with reference to the accompanying drawings wherein.

DETAILED DESCRIPTION

Figure 1:
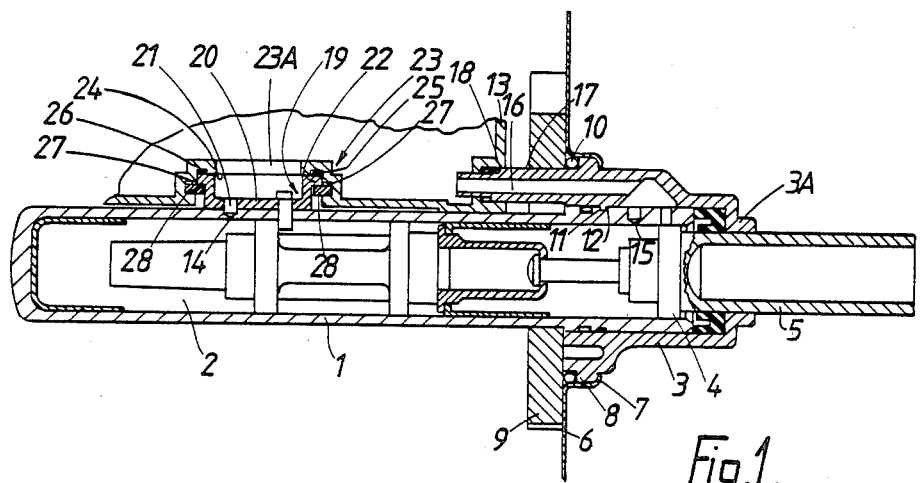
FIG. 1 is a fragmentary longitudinal cross-sectional view of one form of the master cylinder of the invention.
Figure 2:
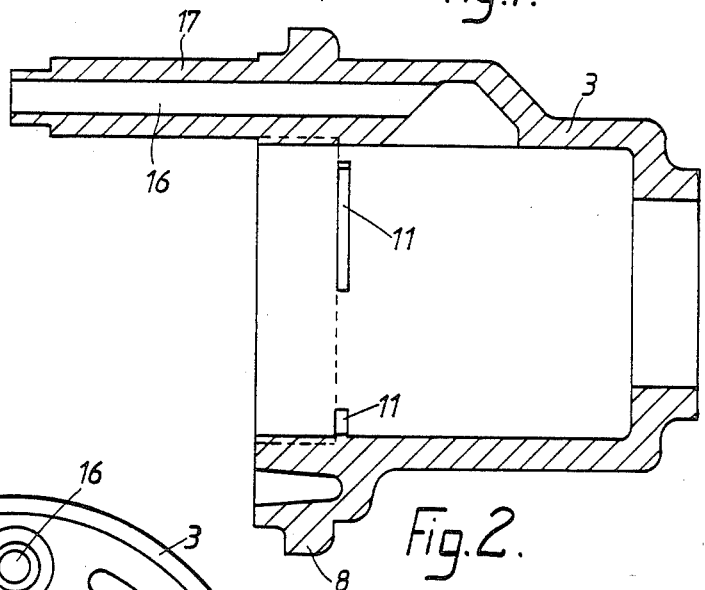
FIG. 2 is a longitudinal enlarged cross-sectional view of part of the master cylinder of FIG. 1.
Figure 3:
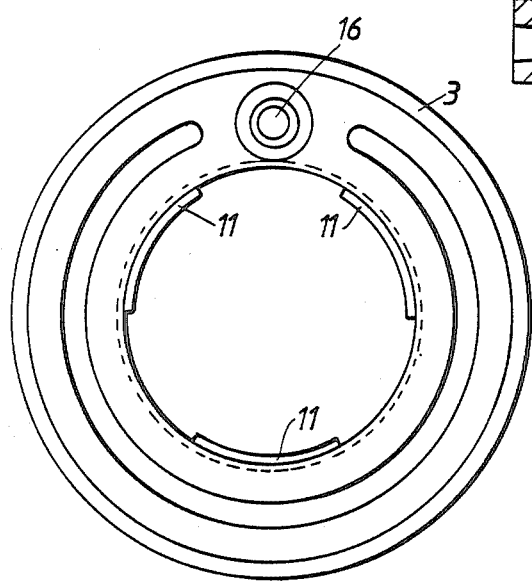
FIG. 3 is a left end view of the part illustrated in FIG. 2.

FIG. 1 of the drawings illustrates part of a tandem master cylinder for use in a dual circuit braking system and comprising a pressure cylinder 1 shown as a thin walled tube of uniform wall thickness having an axial blind bore 2, the open end of which is closed by a closure member 3. The internal components of the pressure cylinder are conventional and have not been shown in detail. However, the rearmost one 4 of a pair of pistons within the bore 2 is illustrated, this piston having a rearwardly extending sleeve 5 through which would extend, in use, an actuating rod (not shown) connected in conventional manner to an actuating member (not shown) of a booster of which a body shell portion is indicated at 6. The shell 6 is shaped to form a retaining flange 7 which lies behind a shoulder 8 of the closure member 3 to retain the closure member in position against a mounting flange 9, between which and the shoulder 8 is trapped a sealing O-ring 10. A boss 3A at the outermost end of the member 3 forms a bearing of axial extent sufficient to provide adequate support for the sleeve 5 of the piston 4. The closure member 3 is positively retained axially on the cylinder 1 by means of projections 11 on the inner wall of the closure member engaging in an annular groove 12 in the outer wall of the cylinder 1. This arrangement is illustrated more clearly in FIGS. 2 and 3, from which the projections 11 are seen to be three in number and symmetrically distributed around the inner wall of the closure member 3.

A reservoir 13 is mounted on the upper side of the cylinder 1 and communicates respectively with the internal chambers of the cylinder through ports 14 and 15 formed transversely through the cylinder wall. The reservoir communicates with the port 15 by way of an axial passage 16 formed in an axial extension 17 of the closure member which is engaged within a lateral opening 18 in the wall of the reservoir. The reservoir 13 is mounted on the cylinder 1 by way of a mounting device 19 which is described in more detail hereafter with reference to FIGS. 1 and 4.

The mounting device 19 is in the form of a generally rectangular dish-like member, of which the base 20 is mounted on the upper side of the cylinder 1 and welded thereto. The base 20 has an opening 21 therethrough which is aligned with the port 14 in the cylinder 1 to permit communication between the mounted reservoir and the bore 2 of the cylinder 1. The device 19 has an outwardly extending flange 22 around the whole of its periphery for the purpose to be described. The reservoir 13 is provided with a mounting formation 23 which includes a central rectangular recess 24, around the periphery of which is formed a groove 25 which contains a seal 26. The formation also includes, respectively along opposed sides thereof, a pair of grooves 27 which receive the legs 28 of a generally U-shaped locking device 29 which can be seen more clearly from FIG. 4.

Figure 4:
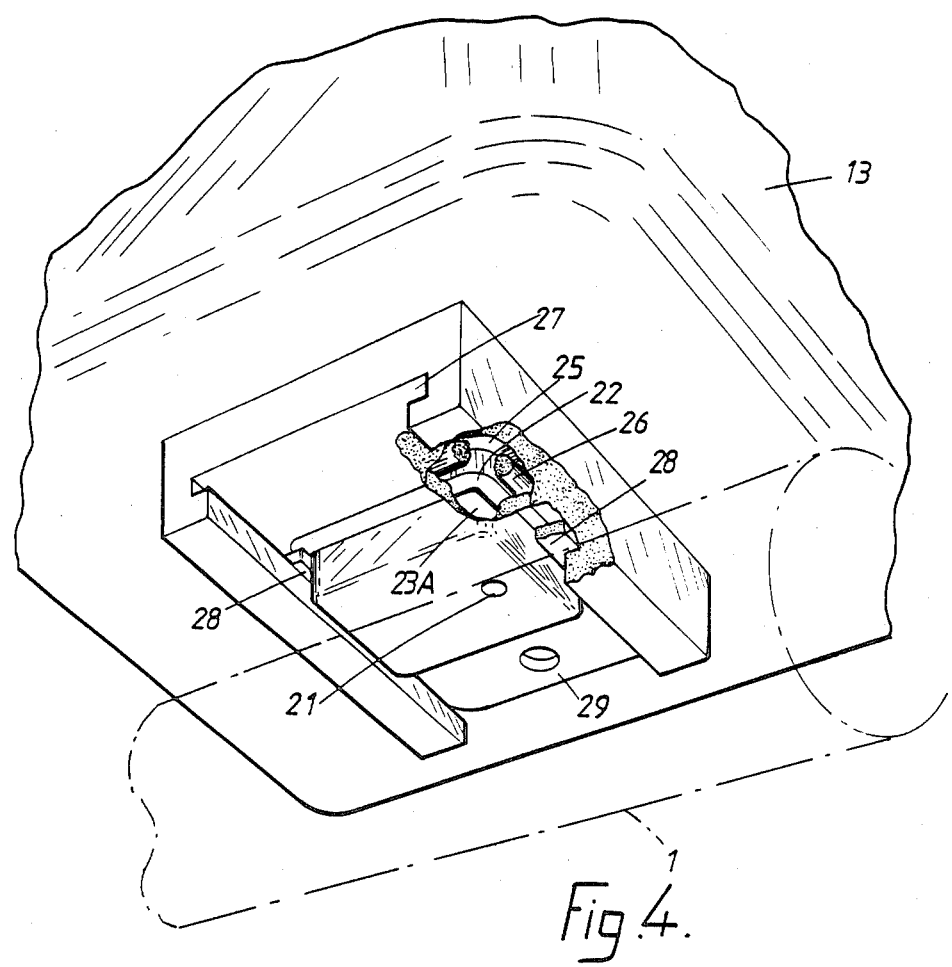
FIG. 4 is a fragmentary perspective view illustrating part of the master cylinder of FIG. 1.

It will be seen from FIG. 4 that the peripheral extent of the flange 22 of the mounting device 19 is such that the flange fits closely within the recess 24 of the mounting formation of the reservoir. In order to mount the reservoir on the cylinder, the mounting formation of the reservoir is offered to the mounting device 19 so that the recess 24 of the formation is in register with the mounting device. The reservoir can then be lowered into position to bring the peripheral flange 22 of the mounting device within the recess 24. At this point, the sealing ring 26 protrudes slightly out of the groove 25 and a force is now applied to the reservoir to compress the seal. This action results in sufficient clearance being provided between the undersurface of the flange 22 and the facing surface of the groove 27 to permit the locking device 29 to be slid transversely between these facing surfaces to a position in which it abuts against the mounting device 19. The reservoir is thereby securely locked to the cylinder and the sealing ring 26 is maintained in a lightly compressed state which ensures a fluid-tight seal around the mounting device. Fluid is able to flow from the interior of the reservoir via an opening 23A, whence it may pass through the port 14 into the pressure cylinder.

Figure 5:
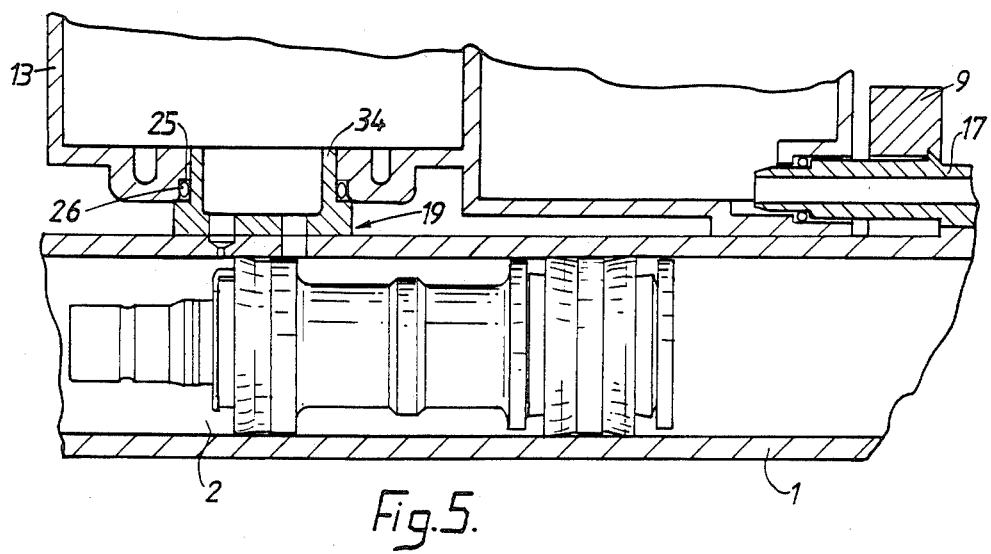
FIG. 5 is a longitudinal cross-sectional view of another embodiment of the master cylinder of the invention.
Figure 6:
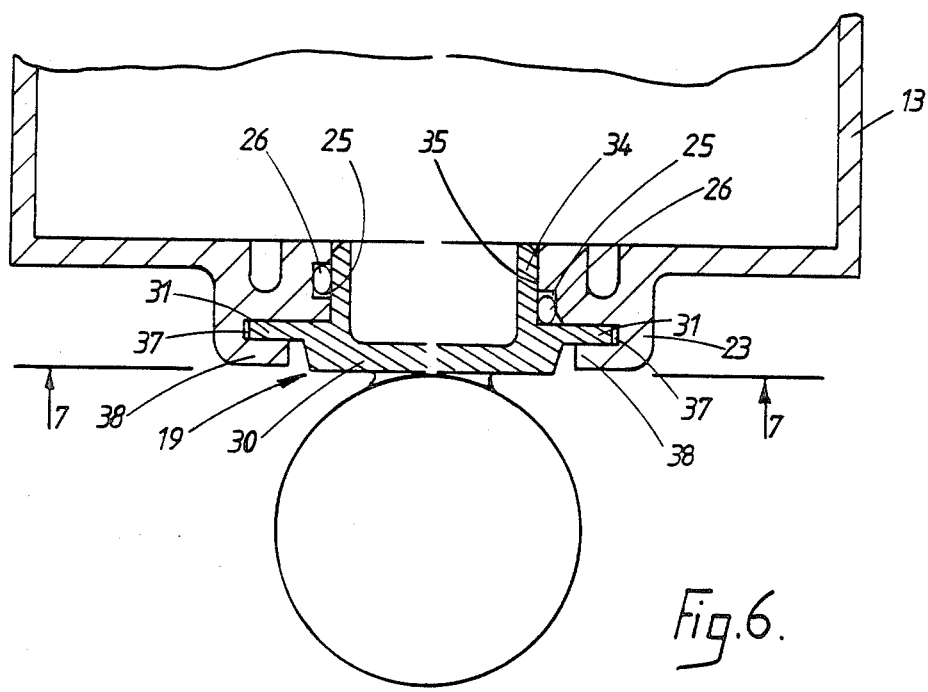
FIG. 6 is an end view, partly in cross-section, of the master cylinder of FIG. 5.
Figure 7:
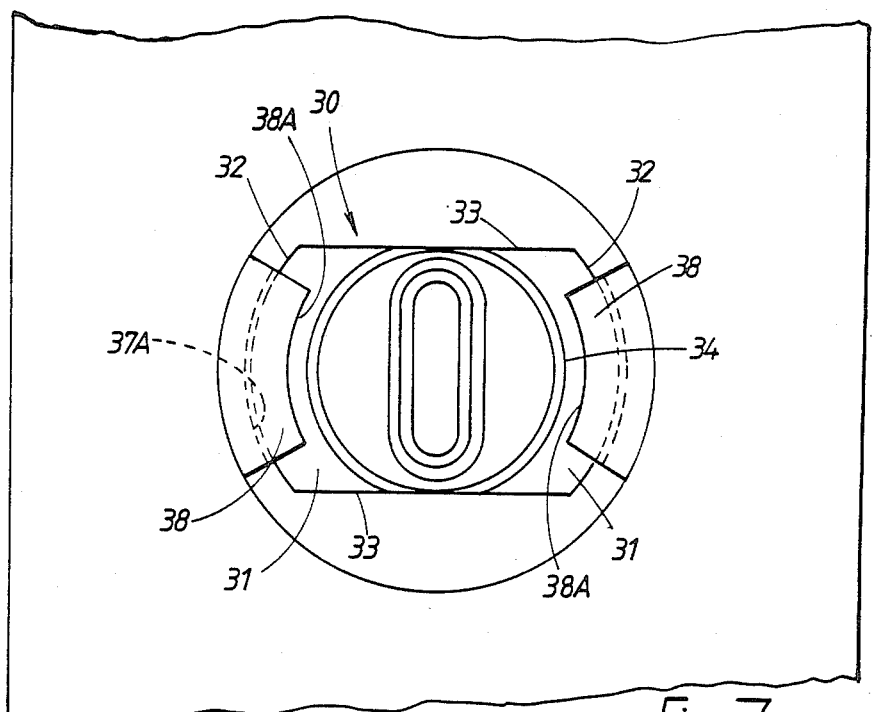
FIG. 7 is a view taken along the line 7—7 of FIG. 6.

In the embodiment of FIGS. 5 to 7, the general arrangement of the cylinder 1 and reservoir 13 is similar to that described above and the internal cylinder components are again conventional. The mounting device 19 in this embodiment has a base 30 having a pair of opposed outwardly directed flanges 31, each having an outermost edge 32 of part-circular form. The remaining edges of the flanges form part of a pair of opposed flat sides 33 of the base. The base has an upstanding hollow cylindrical boss 34 which is closely fitted within a corresponding bore 35 of the reservoir. A seal 26 housed in a recess 25 is compressed radially outwardly by insertion of the boss within the bore 35 and forms a fluid-tight seal between the reservoir and boss. FIG. 6 shows, respectively at the right and left hand sides of the center line thereof, two possible alternative arrangements for housing the seal. At the right hand side of the center line, recess 25 is open in a downward direction and the seal 26 is retained therein by the upper surface of the adjacent flange 31. At the left hand side of the center line, the recess 25 is shown as a groove within which the seal 26 is fully contained when the components are in their assembled condition, as shown.

As will be seen more clearly from FIGS. 6 and 7, the reservoir is formed with a pair of opposed slots 37 which are bounded at the lowermost extremity of the reservoir formation 23 by radially inwardly directed arms 38, each of which has a radially innermost edge 38A which is arcuate about the center of the boss 34 and spaced from the outer surface of the boss. The inner surfaces 37A of the slots 37 are similarly arcuate about the same center and the dimensions of the slots 37 and flanges 31 are chosen so that a small clearance is provided between the edges 32 of the flanges and the surfaces 37A of the slots 37.

The radially inward extent of the arms 38 is such that they overlap the flanges 31 of the formation 19 so as to retain the reservoir in position on the cylinder. In order to assemble the reservoir and cylinder, the boss 34 is offered to the bore 35 with the flanges 31 angularly displaced through about 90° relative to the position illustrated in FIG. 7. This enables the boss 34 to be fully inserted in the bore 35, without interference between the flanges 31 and arms 38, the flanges 31 thereby being brought into positions of alignment with the slots 37. By subsequent relative rotation between the reservoir and cylinder, the flanges 31 may be moved into the slots to the positions illustrated in FIG. 7, so that the reservoir is effectively locked in position on the cylinder. Unwanted further relative rotation between these components, once assembled, is prevented by inserting the extension 17 into the corresponding bore in the reservoir, as explained in connection with the previous embodiment, so that the extension 17 now performs the dual function of providing a fluid path between the respective interiors of the cylinder 1 and reservoir 13 and of preventing the aforesaid unwanted relative rotation. It will be understood that the numbers of arms 38 and flanges 31 may be varied in any convenient manner and, in arrangements where the extension 17 is not provided, or additional security against relative rotation of the components is required, alternative or additional locking means may be employed.

It will be understood that, in the FIG. 1 embodiment, for which no relative rotation between the reservoir and cylinder is required, two or more mounting devices may be provided, spaced along the cylinder, in place of the single device illustrated, and an appropriate number of mounting formations on the reservoir would then be required. In a further alternative arrangement applicable to all embodiments, the or each mounting device may be employed solely for mounting purposes without providing any communication between the reservoir and cylinder ports. Separate porting arrangements between the reservoir and cylinder would then be provided. The invention may be applied to both single and tandem master cylinders irrespective of the nature of their internal components which may take a variety of forms.

We claim:

1. A master cylinder assembly comprising: a pressure cylinder; a reservoir mounted thereon; a first mounting formation on the cylinder; a second formation on the reservoir; a recess in one of said mounting formations for receiving, in interengagement with, the other formation; a pair of oppositely disposed grooves in said recess, each groove having a planar retaining surface thereon; a pair of oppositely disposed lateral flanges on the other mounting formation having peripheral dimensions slightly less than the dimensions of said recess so that said flanges are insertable into said recess by relative substantially perpendicular movement of said flanges and recess, and said flanges respectively lie adjacent said grooves when said formations are interengaged, each flange having a planar retaining surface thereon lying in a plane facing the plane of said retaining surface on a respective one of said grooves; and a separate locking member having a pair of spaced parallel legs which engage in said grooves of said first mounting formation in such a manner that each leg bridges between a retaining surface of the groove within which it lies and a respective retaining surface of the adjacent flange for retaining said reservoir on said cylinder.

2. A master cylinder assembly as claimed in claim 1 and further comprising:
   a sealing ring groove in said recess positioned to face contiguously a second surface of each flange opposite to each retaining surface on each flange respectively; and
   a resilient sealing ring in said sealing ring groove which is compressed between said sealing ring groove and said second surface of each flange to form a fluid-tight seal when said formations are interengaged and retained by said locking device.

3. A master cylinder assembly as claimed in claim 1 and further comprising:
   an opening in said second mounting formation; and
   at least one port extending through said first mounting formation aligned with a port extending through said pressure cylinder, said opening and ports providing communication between the reservoir and pressure cylinder.

4. A master cylinder assembly as claimed in claim 2 and further comprising:
   an opening in said second mounting formation; and
   at least one port extending through said first mounting formation aligned with a port extending through said pressure cylinder, said opening and ports providing communication between the reservoir and pressure cylinder.

5. A master cylinder assembly as claimed in claim 1 wherein:
   said pair of oppositely disposed grooves in said recess are parallel; and
   said oppositely disposed lateral flanges are parallel.

* * * * *